Patented June 9, 1925.

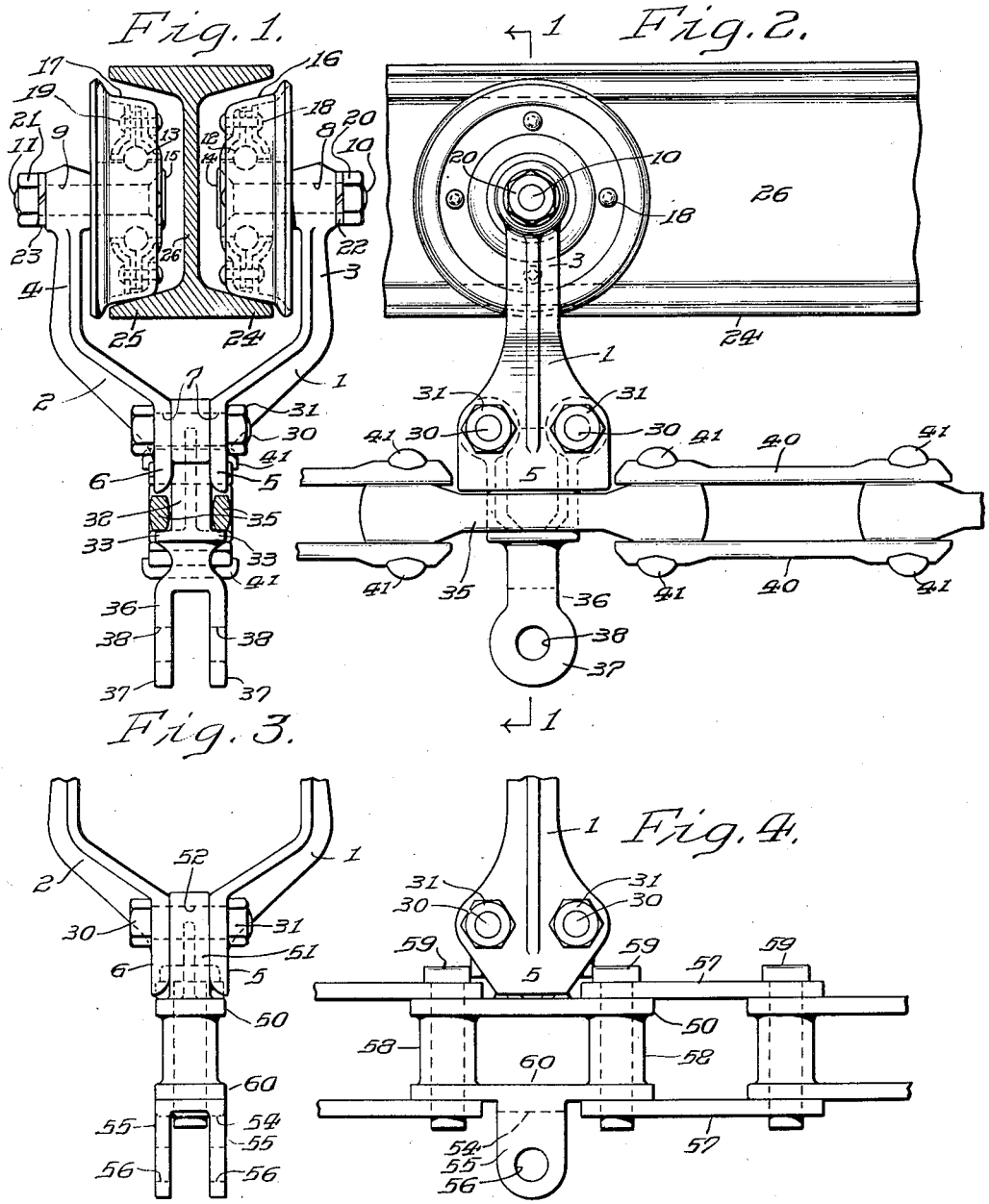

1,541,539

UNITED STATES PATENT OFFICE.

JERVIS B. WEBB, OF DETROIT, MICHIGAN.

TROLLEY FOR CHAIN CONVEYERS.

Application filed September 23, 1924. Serial No. 739,258.

*To all whom it may concern:*

Be it known that I, JERVIS B. WEBB, a citizen of the United States, and a resident of Detroit, in the county of Wayne and State of Michigan, have invented an Improvement in Trolleys for Chain Conveyers, of which the following is a specification.

My invention relates to an improved and novel construction of trolley adapted to be used for supporting chain conveyers and it has for its general object to provide a trolley of novel construction of relatively great strength which may be readily attached and detached from a chain and simultaneously placed in co-operative relation to the trolley wheel supporting means.

The invention comprehends the construction and arrangement of parts as hereinafter described in detail, particularly pointed out in the claims, and as illustrated in the accompanying drawing in which I have illustrated certain convenient forms of embodiment thereof. However it will be understood that the invention is susceptible of embodiment in other forms of construction than those shown and that changes in the details thereof may be made within the scope of the claims without departing from the said invention.

In the drawing:

Fig. 1 is a transverse sectional view taken on the line 1—1 of Fig. 2;

Fig. 2 is a view in side elevation of a trolley, a portion of chain supported thereby and a portion of the means for supporting the trolley;

Fig. 3 is a view showing a slightly modified construction embodying the said invention, the said view showing a link in end elevation and portions of a trolley for supporting a portion of chain; and Fig. 4 is a view in side elevation of the structure shown in Fig. 3.

Referring to the drawing: 1 and 2 designate the opposite side members or brackets which constitute portions of the trolley. The lower end portions of the members 1 and 2 are arranged in angular relation to the upper end portions 3 and 4 thereof so that when the said upper portions 3 and 4 are arranged in parallel relation to each other as shown in Fig. 1 the lower end portions converge. The converging lower end portions end in relatively flat terminals 5 and 6 which also are in parallel relation to each other and occupy positions closer to each other than do the upper portions 3 and 4. The terminals 5 and 6 are provided with openings as indicated at 7 spaced from each other, as shown, and when the parts 1 and 2 are brought into co-operative relation, as shown, the holes 7 in the respective terminals 5 and 6 are in registry with each other. The upper ends of the brackets 1 and 2 are provided with openings 8 and 9 through which the outer ends of bolts 10 and 11 are adapted to project. Ball-bearing structures 12 and 13 are mounted upon the inner end portions of the bolts 10 and 11 and are retained thereon by the heads 14 and 15 upon the inner ends thereof. Wheel rim portions 16 and 17 are secured to the outer portions of the said ball-bearing structures by means of rivets 18 and 19, as indicated. The bolts 10 and 11 are retained in place within openings 8 and 9 by means of nuts 20 and 21. The latter are prevented from becoming unscrewed accidentally from the said bolts by means of locking devices 22 and 23. The wheels comprising the ball-bearing structures 13 and 14 and the rims 16 and 17 are supported upon the upper side of the opposite flanges 24 and 25 of an I-beam 26.

In the construction, as shown in Figs. 1 and 2, the brackets 1 and 2 are held in place with the wheels previously referred to upon the upper sides of the flanges 24 and 25 by means of headed bolts 30 which extend through the holes 7 and are retained in place by nuts 31. The said bolts also extend through openings in the upper end of an extension bar comprising a flattened upper end portion 32. The lower end of said extension bar terminates or ends in shoulders 33. The said flattened portion 32 extends upwardly between the opposite sides of a link 35, of integral form. The lower edges of the opposite sides of said link rest upon the upper sides of the shoulders 33. The lower edges of the terminals 5 and 6 are situated in adjacent relation to the upper edges of the opposite sides of the link 35. It will be seen therefore that the link 35 is loosely connected with the extension bar 32. The said bar is also provided with an extended portion 36 which is slotted as shown in Fig. 1 to provide the oppositely disposed spaced side portions 37 which are provided with openings 38, as indicated, the presence of which facilitates the suspending of articles from the lower end of the said bar 32. These trolley devices are located at intervals with respect to the length of the chain conveyer and each of which is secured to the said chain in the manner as indicated in Figs. 2 and 3 and as above described.

The integrally constructed links 35 alternate with links comprising oppositely disposed side members 40 and the said links are connected to each other by pintles having elongated heads 41, of known construction.

In the construction as illustrated in Figs. 3 and 4 the bracket members 1 and 2 are identical with those shown in Figs. 1 and 2 and the said brackets are intended to be supported upon a support in identically the same manner as shown in Figs. 1 and 2. In the said Figs. 3 and 4, 50 designates an integral link structure the upper side of which is provided with a relatively flat and relatively wide projection 51 provided with openings 52 therethrough which are spaced from each other so as to register with the openings 7 when the terminals 5 and 6 of the brackets 1 and 2 are placed in position upon the opposite sides of the said projection 51.

The lower side of the link 60 is provided with a projection which is slotted as indicated at 54. The presence of the said slot provides oppositely disposed spaced sides as indicated at 55 each of which is provided with an opening 56 the presence of which facilitates the suspending of articles therefrom.

The integrally constructed links 50 alternate with links consisting of oppositely disposed separate or individual side members 57. The links are connected together by means of pintles 58 the upper ends of which are provided with elongated rectangular shaped heads 59.

It will be seen that by my invention I have provided a trolley consisting of two bracket-like members upon the upper ends of which trolley wheels are mounted which wheels are adapted to be placed upon the opposite sides of a trolley support. The lower ends of the said bracket members are adapted to embrace and to be connected with an upwardly extending projection which may be independent of and separate from the said chain as shown in Figs. 1 and 2 or it may be an integral part of links occurring at intervals in the chain structure. In either form of construction it will be seen that the bracket members may be readily connected simultaneously with the chains and with the supporting means therefor, and that means for connecting the said brackets to a chain operate to hold the trolley upon the support therefor. In the preferred form of construction shown in Figs. 1 and 2 the only strain to which the chain need be subjected is that of causing traveling movement of the trolley devices, the loads carried thereby and the chain itself. The weight or load to be carried is suspended from the trolley device and in such case the load is transmitted directly to and carried by the trolley supporting means.

In the construction as shown in Figs. 3 and 4 the integrally constructed links to which the brackets 1 and 2 are connected at intervals in the length of the chain become, in effect, a part of the trolley structure, but this difference in the construction does not alter the facility with which the brackets 1 and 2 may be connected with the chain structure and with the support therefor.

Having thus described my invention what I claim and desire to secure by Letters Patent is:

1. A trolley for supporting a chain conveyer, comprising oppositely disposed brackets having wheels secured upon the inner sides thereof which wheels are adapted to rest upon the opposite side portions of a trolley support, a device adapted to extend between the opposite sides of a link of a chain, and means for securing the lower ends of the said brackets to the upper end portion of the said device to effect retention of the latter in interlocked relation with the link.

2. A trolley for supporting a chain conveyer, which trolley comprises angular brackets and wheels secured upon the inner sides of the upper end portions of the said brackets, which wheels are located in oppositely disposed relation to each other and adapted to rest upon the opposite sides of a support therefor, a bar having a reduced upper end portion which is adapted to extend between the opposite sides of a chain link of integral structure, which bar is adapted to extend between and to be embraced by the lower ends of said brackets, and means for connecting the said lower ends to the said bar and for simultaneously connecting the said brackets to the supporting means for the said trolley.

3. A trolley for chain conveyers, comprising bracket members arranged in oppositely disposed spaced relation to each other, the upper ends of said brackets being spaced farther apart than the lower ends thereof, trolley wheels secured upon the inner sides of the upper end portions of said brackets which wheels are adapted to rest upon a trolley support, a bar having a reduced upper end portion which is adapted to extend between the opposite sides of a link of integral structure and into the space between the lower ends of the said brackets, means for securing the said lower ends of said brackets to the said upwardly projecting end portion of the said bar and for simultaneously securing the said trolley upon its supporting means, and the said bar being provided with shoulders upon which the lower edges of the said chain links rest and also with a depending projection from which loads are adapted to be suspended.

4. A trolley for supporting a chain conveyer, which trolley comprises oppositely disposed angular bracket members the upper end portions of which are spaced farther apart than the lower end portions thereof, trolley wheels mounted upon the inner sides of the upper end portions of said brackets which wheels are adapted to rest upon a trolley support and means for connecting the lower ends of said brackets to a chain conveyer which means operates to secure the said brackets to the trolley supporting means.

5. The combination of a trolley support having oppositely extending flanges at its lower edge, bracket arms situated in oppositely disposed relation to each other, the upper end portons being spaced farther apart than the lower end portions thereof, trolley wheels secured upon the upper end portions thereof which wheels are adapted to rest upon and be supported by the said oppositely extending flanges, a chain conveyer and means for connecting the lower ends of said bracket arms to said conveyer and for simultaneously securing the said bracket arms to the said trolley support, substantially as described.

In testimony that I claim the foregoing as my invention I have hereunto set my name this 14th day of July, A. D., 1924.

JERVIS B. WEBB.